(12) United States Patent
Sakamoto

(10) Patent No.: US 7,840,343 B2
(45) Date of Patent: Nov. 23, 2010

(54) MOBILE TERMINAL HAVING MAP DISPLAY FUNCTION, MAP DISPLAY SYSTEM, INFORMATION DISTRIBUTION SERVER AND PROGRAM

(75) Inventor: Hiroshi Sakamoto, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 621 days.

(21) Appl. No.: 10/592,058

(22) PCT Filed: Mar. 2, 2005

(86) PCT No.: PCT/JP2005/003540

§ 371 (c)(1),
(2), (4) Date: Sep. 8, 2006

(87) PCT Pub. No.: WO2005/086120

PCT Pub. Date: Sep. 15, 2005

(65) Prior Publication Data

US 2007/0198180 A1  Aug. 23, 2007

(30) Foreign Application Priority Data

Mar. 9, 2004  (JP)  .............................. 2004-065358

(51) Int. Cl.
*G01C 21/30* (2006.01)

(52) U.S. Cl. ........................ 701/208; 701/200; 701/211; 701/213; 382/100; 382/305; 382/306; 235/462.01; 235/462.09; 455/456; 455/457; 340/995

(58) Field of Classification Search .................. 701/200, 701/208, 213, 211; 382/100, 305; 235/462.01, 235/462.09; 340/995; 455/456, 457
See application file for complete search history.

(56) References Cited

U.S. PATENT DOCUMENTS 7,487,042 B2 * 2/2009 Odamura .................... 701/213
7,606,664 B2 * 10/2009 Yokozawa .................. 701/211

FOREIGN PATENT DOCUMENTS

| GB | 2358515 A |   | 7/2001 |
|----|-----------|---|--------|
| JP | 2001-118187 A |   | 4/2001 |
| JP | 2003-5629 A |   | 1/2003 |
| JP | 2003005629 | * | 1/2003 |
| JP | 2004-21548 A |   | 1/2004 |
| JP | 2004257872 A | * | 9/2004 |

OTHER PUBLICATIONS

International Preliminary Report on Patentability for PCT/JP2005/003540 mailed on Dec. 28, 2006.
Takayuki Nagaya et al., "Kosoku Yomitori Taio 2 Jigen Code 'QR Code' no Kaihatsu", Dai 52 Kai (Heisei 8 Nen Zenki) Zenkoku Taikai Koen Ronbunshu (2), Jinko Chino oyobi Ninchi Kagaku, Media Joho Shori, Mar. 6, 1996, pp. 253 to 254.
International Search Report mailed Jun. 7, 2005 of International Application PCT/JP2005/003540.

* cited by examiner

*Primary Examiner*—Tuan C To
*Assistant Examiner*—Redhwan Mawari
(74) *Attorney, Agent, or Firm*—Westerman, Hattori, Daniels & Adrian, LLP

(57) ABSTRACT

When displaying map information including a place where a 2-dimensional code is set according to the information containing the 2-dimensional code, the map can be displayed in a direction facilitating a user to view the map. A mobile terminal includes 2-dimensional code read means for reading a 2-dimensional code set at a particular location and containing position information on the location where it is set and the azimuth information on the location with respect to the read reference direction of the 2-dimensional code. The mobile terminal further includes display means for displaying a map, rotation angle calculation means, and map rotation means. The 2-dimensional code read means outputs position information recorded in the 2-dimensional code and the 2-dimensional code read reference direction and azimuth information. The rotation angle calculation means calculates a rotation angle from the 2-dimensional code read reference direction and azimuth information. The display means displays a map including the 2-dimensional code setting position rotated according to the rotation angle.

1 Claim, 10 Drawing Sheets

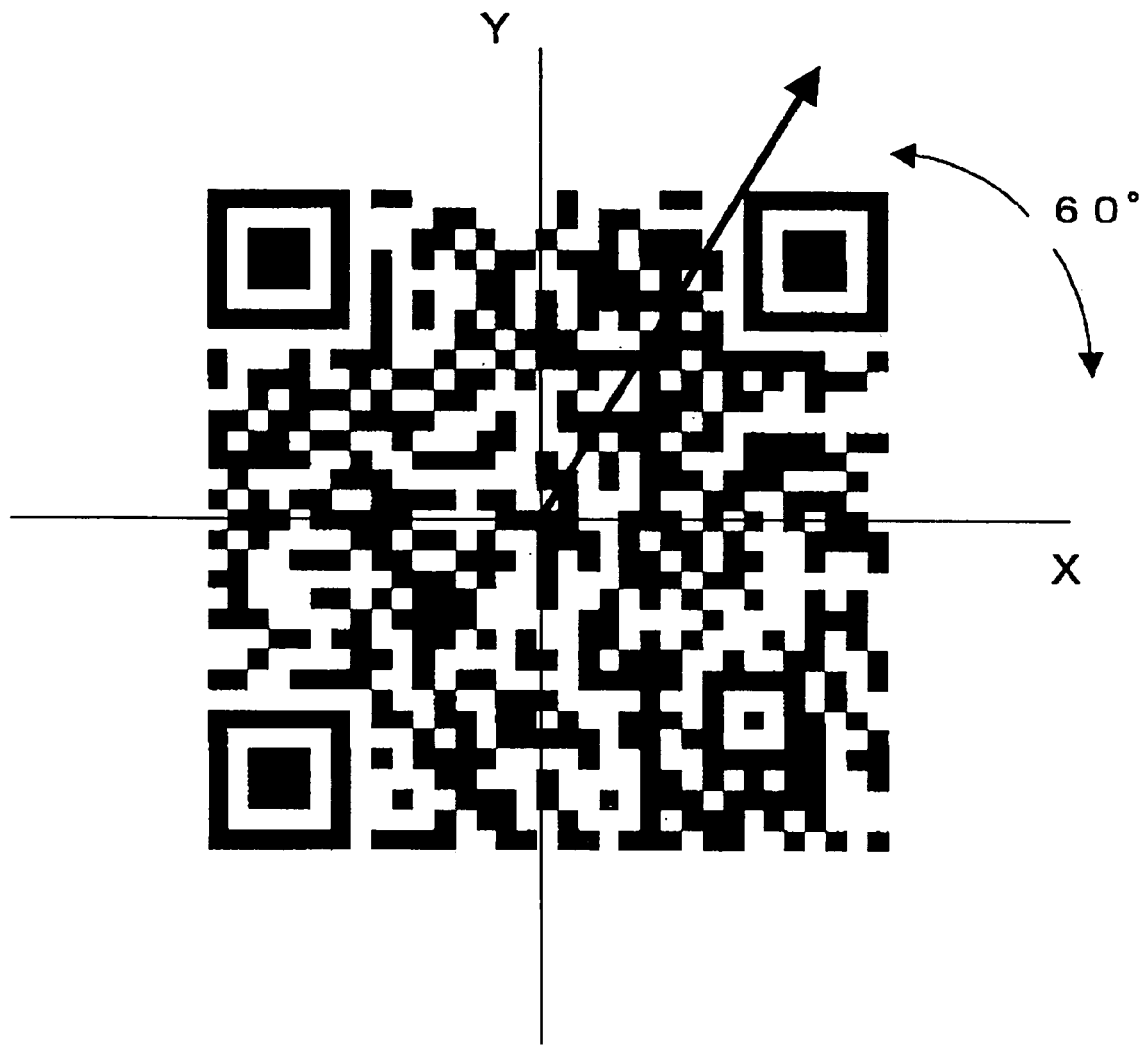
F I G. 1

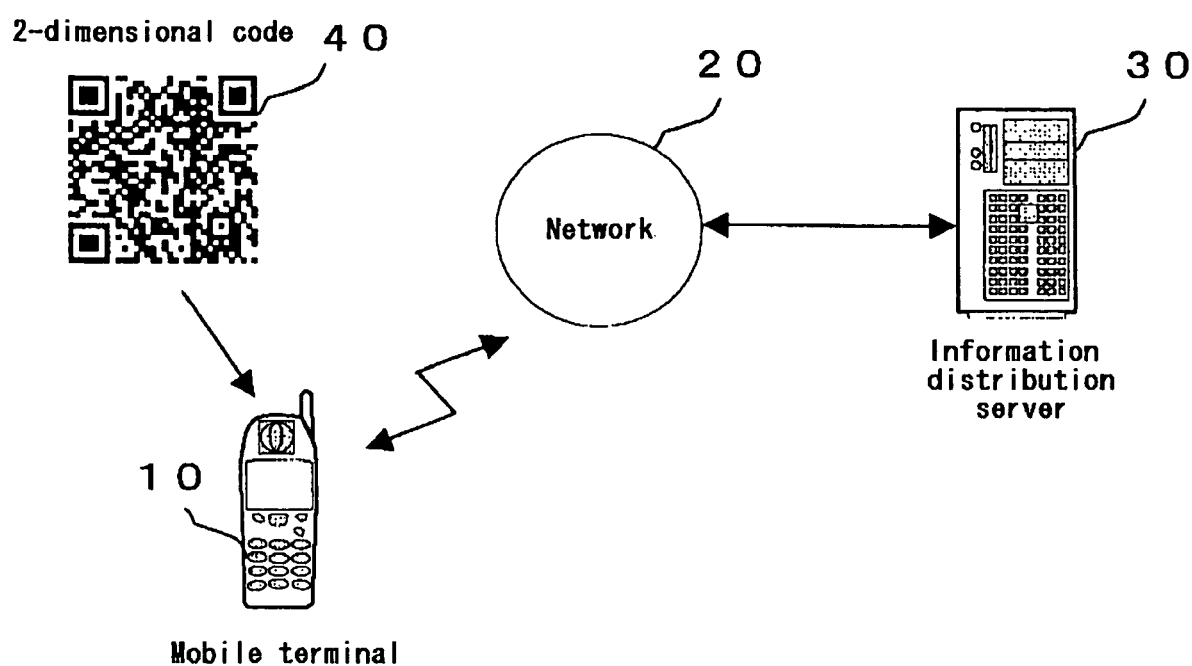
F I G. 4

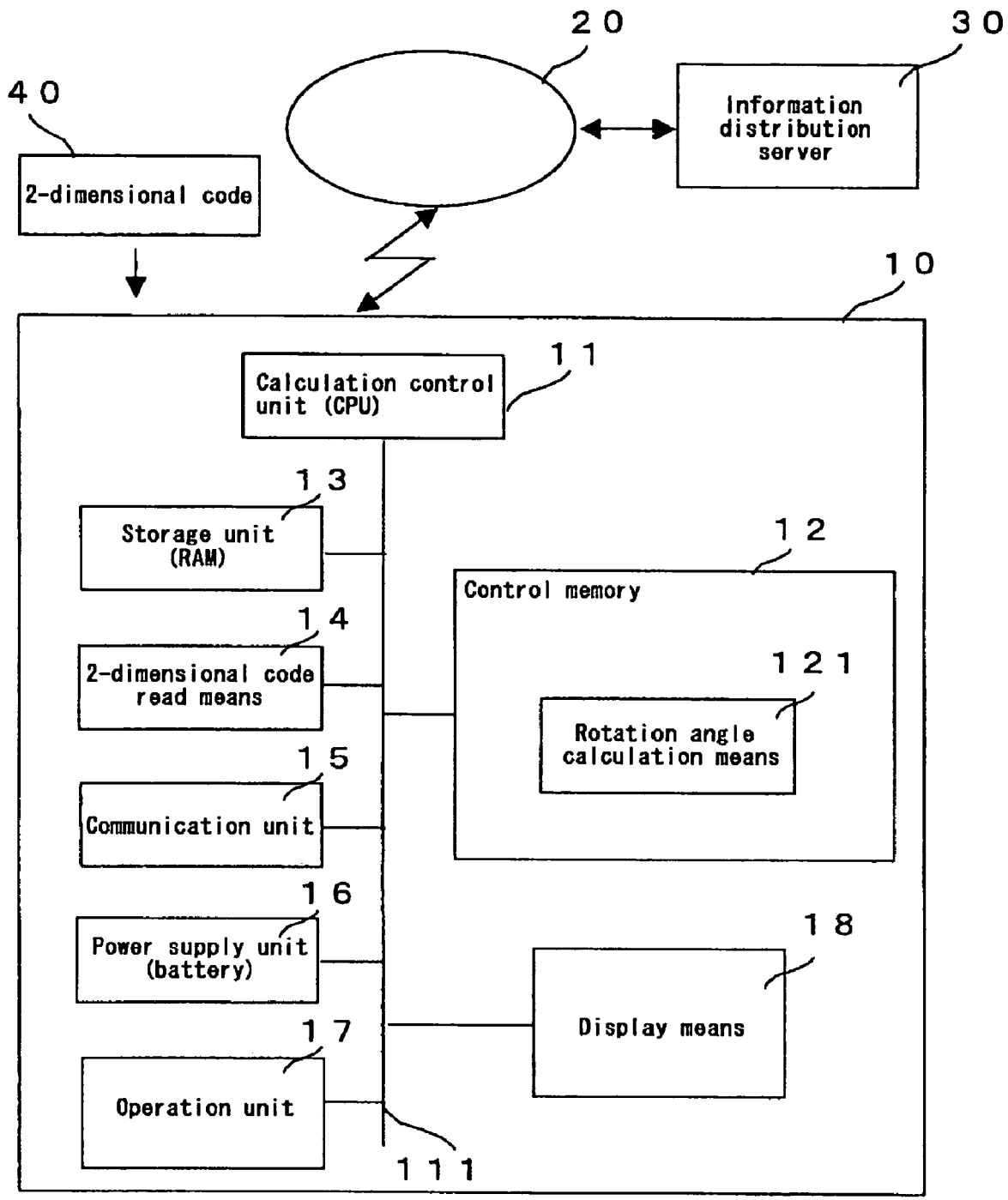
F I G. 6

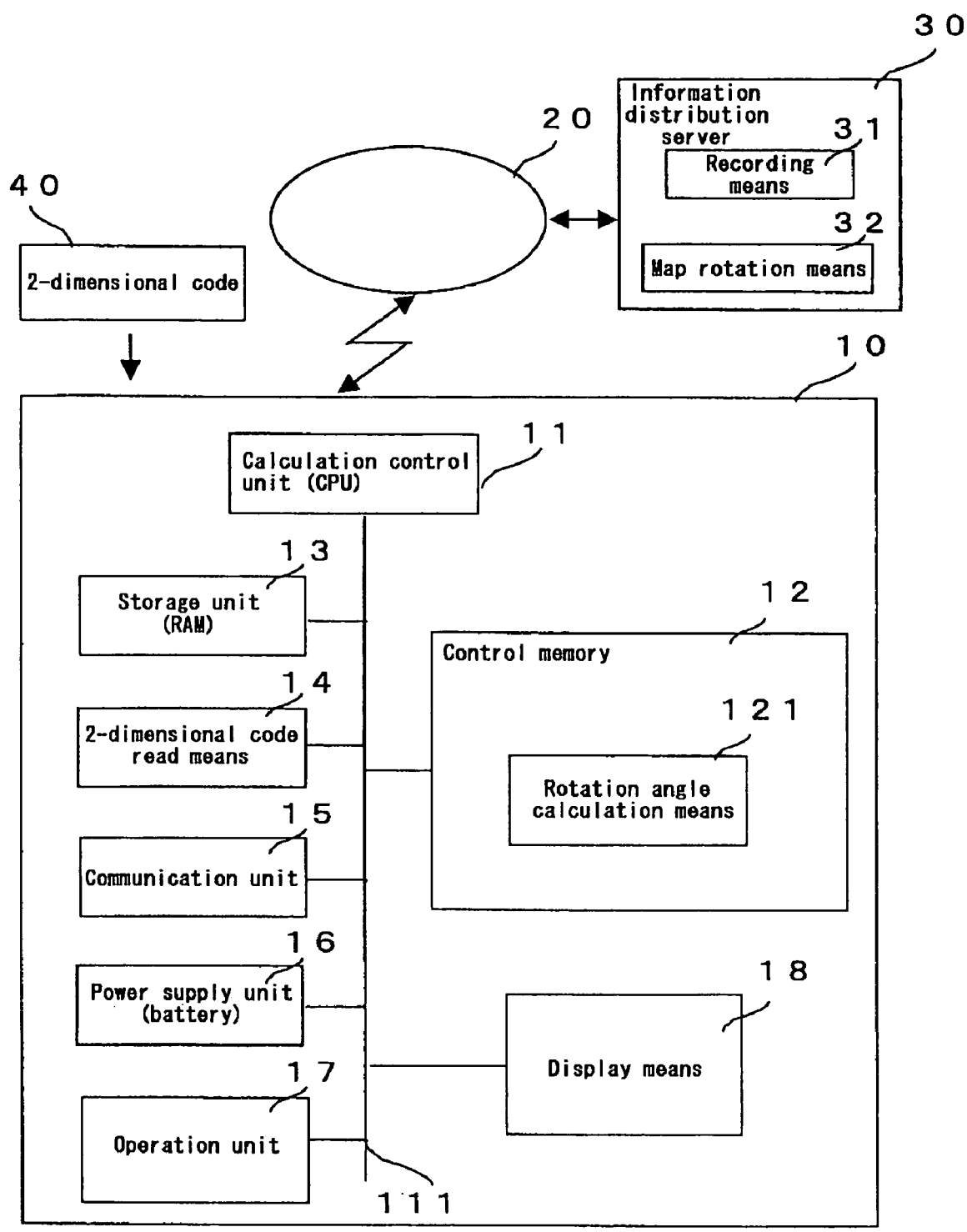
F I G. 9

US 7,840,343 B2

MOBILE TERMINAL HAVING MAP DISPLAY FUNCTION, MAP DISPLAY SYSTEM, INFORMATION DISTRIBUTION SERVER AND PROGRAM

TECHNICAL FIELD

The present invention relates to a mobile terminal, such as a mobile phone or the like, equipped with a function for reading a 2-dimensional code and, based on information obtained from the 2-dimensional code, displays a map containing specific places, and to a map display system, an information distribution server and a program therefor, and more particularly, to a mobile terminal equipped with a map display function and based on information recorded in a 2-dimensional code, is configured in such manner as to display a map in a certain direction to facilitate viewing thereof for the user, wherein the map contains a place established by the 2-dimensional code, and to a map display system, an information distribution server and a program therefor.

RELATED ART

The proliferation of mobile phones functioning as mobile terminals as a result of recent developments in information and communications technology and related infrastructure improvement has been remarkable, as users can now have access to a myriad of services for hire or for free, using a mobile terminal. Various kinds of applications have become possible, especially for mobile terminals typified by mobile phones which can send images taken from a built-in camera via email, or which can access desired information pertaining to such taken images and the like over the Internet.

If a 2-dimensional code is printed onto a magazine, a newspaper or a newspaper insert, or displayed on a billboard or the like, and is recorded together with various kinds of information relating to the advertiser, for example, information concerning a homepage URL (Uniform Resource Locator) established by the advertiser, the acquiring location and destination location of the 2-dimensional code, map and URL of the navigation server, as well as the advertiser's name and profile including his telephone number, address, business hours, holidays and the like, users can receive navigation information by utilizing the information scanned to access the advertiser's homepage and acquiring a map leading to the advertiser's place of business.

This kind of system has been disclosed in, for example, JP 2002-48586 A (hereinafter, "Patent Document 1"). The navigation system disclosed in Patent Document 1 provides navigation information pertinent to a certain destination without the need to input the user's present location, on the basis of available optical data that is instantaneously read by means of a single operation. The method comprises the initial step of reading optical data (2-dimensional code) displayed on an advertising medium using a reading, device mounted on a portable information apparatus; the second step of decoding the optical data by means of a portable information apparatus to convert the data to information consisting of character data for at least one code acquiring position and a destination position; the third step of transferring the character data to a navigation server through a communication network, using the portable information apparatus; and the fourth step, whereby the navigation server transmits a guide route to the portable information apparatus from the code acquiring position to the destination position, through the communication network.

A system has also been proposed which establishes (by a method such as attaching, etc.), a symbol pattern (i.e., 2-dimensional code) on billboards or power poles situated in specified places, and such pattern is read by a camera or other reading means mounted on a portable terminal, whereby map information can be obtained based on information recorded in the 2-dimensional code. For example, the system disclosed in JP 2003-319033 A (hereafter "Patent Document 2") refers to photographing a symbol pattern shown on a bulletin board using a digital camera disposed on a mobile phone, whereupon the photographed still picture image is transmitted to a video processing server, on the basis of which the symbol pattern is recognized and converted into corresponding data. Based on the converted data, the video processing server transfers the information held by an information server to the mobile phone. As a result, the information shown on the bulletin board can be linked with more detailed information simply by displaying the symbol pattern of the bulletin board on the screen of the mobile phone, and clicking the pattern.

In other words, the system disclosed in Patent Document 2 enables information to be downloaded from a map-providing server simply by recording the URL of a server for providing map information in the form of a symbol pattern, reading the pattern with the aid of a mobile phone camera and linking it to the applicable URL. By allocating a symbol pattern to position or location information pertaining to the respective bulletin boards or power poles, a map information distribution server can determine the location of the bulletin board or power pole whose symbol pattern has been read by the mobile phone, thus enabling distribution of map information containing the position (place) to the mobile phone.

While various modes exist as 2-dimensional codes, examples thereof have been disclosed in Patent Documents 1 and 2 and JP 2000-222517 A, JP 2000-337853 A and JP 9-50481 A (hereinafter, "Patent Document(s) "3", "4" and "5", respectively).

DISCLOSURE OF INVENTION

Problems to be Solved by the Invention

In the case of acquiring map information based on information recorded in a 2-dimensional code, when a mobile terminal reads the 2-dimensional code and displays the map information on the display section of such mobile terminal, it is uncertain how the map will be displayed on the mobile terminal at the place where the user is located at the time that the 2-dimensional code is read. Normally, maps are reproduced indicating north at the top, so north is also shown at the top during display. This is referred to as "north-up". If a mobile terminal user is facing north at the point where the 2-dimensional code is read, the user can read the map without any trouble if, as is usually the case, north is displayed at the top.

However, if the map displayed on the mobile terminal shows north at the top, but the user is facing south, the user would have to reverse the mobile terminal to allow him to read the map in the same direction that he is facing, otherwise, if the user does not reverse the mobile terminal, he would have to read the map by reversing it mentally. Rotating a map when the direction of the map does not match the direction that the user is facing to let him read the map in the same direction is often resorted to.

The mobile information device and map information distribution system disclosed in Patent Documents 1 and 2 does not take into account the direction in which a distributed map is displayed on the display section of a mobile terminal, rendering it inconvenient for the user. While it is possible to mount a geomagnetic sensor onto the mobile terminal to detect an azimuth, and then rotate the map to match the azimuth, since geomagnetism is however often substantially disrupted in an underground train system, underground shopping area or inside a building, in many cases the direction of the map cannot be rotated to a preferable direction to conform to the direction which the user is facing. In addition, the attendant increase in costs occasioned by mounting a geomagnetic sensor onto the mobile terminal cannot be ignored.

As a result of various investigations conducted by the inventors to resolve the above-described problems, the present invention was conceptualized by focusing on the fact that since a 2-dimensional code allows the detection of code read reference orientation, if information pertaining to the user's position where the mobile terminal reads the 2-dimensional code (i.e., position information of the location where the 2-dimensional code is established) and azimuth information can be acquired in relation to 2-dimensional code read reference orientation when such 2-dimensional code is read, a map can be specified based on such position information and the rotation angle for rotating and displaying the map on the display section of the mobile terminal can be calculated based on the read reference orientation and the azimuth information with respect thereto.

In other words, the present invention aims to resolve the above-described problems by providing a mobile terminal for a map display, a map display system, an information distribution server and a program, by which a map can be displayed in the direction in which viewing is facilitated, wherein the map information displayed contains the place where a 2-dimensional code is established, based on information recorded in the 2-dimensional code. Although in a narrow sense the term "map", which is the matter subject of display in the present invention, refers to a road map, its application is not limited to such a definition. The term "map" as used in the present invention broadly encompasses guide maps pertaining to the inner structure of the venue of a program or event as well as guide maps showing the layout of train stations, art galleries, hospitals and the like.

To resolve the above-described problems, the invention according to claim 1 of the present application refers to a mobile terminal equipped with a map display function, comprising a 2-dimensional code reading means for reading the position information of a particular location consisting of a 2-dimensional code established at such location and corresponding recorded azimuth information in relation to 2-dimensional code read reference orientation, and the 2-dimensional code reading means outputs the position information recorded in the 2-dimensional code, the 2-dimensional code read reference orientation and the azimuth information, wherein the mobile terminal further comprises rotation angle calculation means and display means for displaying a map, whereby the rotation angle calculation means calculates the rotation angle according to 2-dimensional code read reference orientation and azimuth information, and the map based on the position information is rotated based on the rotation angle and the display means displays the rotated map.

The invention according to claim 2 of the present application refers to a map display system which comprises an information distribution server for distributing map information to a mobile terminal based on position information sent therefrom, wherein the mobile terminal comprises a 2-dimensional code reading means for reading the position information of a particular location consisting of a 2-dimensional code established at such location and corresponding recorded azimuth information in relation to 2-dimensional code read reference orientation, as well as communication means, display means for displaying a map and rotation angle calculation means, whereby the 2-dimensional code reading means outputs the position information recorded in the 2-dimensional code, the 2-dimensional code read reference orientation and azimuth information, the rotation angle calculation means calculates the rotation angle according to 2-dimensional code read reference orientation and azimuth information, the communication means sends the position information to the information distribution server and receives map information based on such position information, and the map based on position information is rotated according to the rotation angle and the display means displays the rotated map.

The invention according to claim 3 of the present application refers to a map display system which comprises an information distribution server for distributing map information to a mobile terminal based on position information sent therefrom, wherein the mobile terminal comprises a 2-dimensional code reading means for reading the position information of a particular location consisting of a 2-dimensional code established at such location and corresponding recorded azimuth information in relation to 2-dimensional code read reference orientation, as well as communication means, display means for displaying a map and rotation angle calculation means, whereby the 2-dimensional code reading means outputs the position information recorded in the 2-dimensional code, the 2-dimensional code read reference orientation and azimuth information, the rotation angle calculation means calculates the rotation angle according to 2-dimensional code read reference orientation and azimuth information, the communication means sends the position information and rotation angle to the information distribution server and receives rotated map information based on such position information and rotation angle, and the display means displays a map received from the information distribution server.

The invention according to claim 4 of the present application refers to a map display system which comprises an information distribution server for distributing map information to a mobile terminal based on position information sent therefrom, wherein the mobile terminal comprises a 2-dimensional code reading means for reading the position information of a particular location consisting of a 2-dimensional code established at such location and particular recorded ID information for specifying the 2-dimensional code, as well as communication means and display means for displaying a map, the information distribution server comprises recording means containing recorded azimuth information of the location in relation to 2-dimensional code read reference orientation corresponding to the 2-dimensional code ID information, the mobile terminal or information distribution server comprises rotation angle calculation means and/or map rotation means, the 2-dimensional code reading means outputs the position information recorded in the 2-dimensional code and the ID information of the 2-dimensional code, the communication means sends the position information and ID information to the information distribution server and receives map information based on such position information coming from the information distribution server, the rotation angle calculation means calculates the rotation angle according to 2-dimensional code read reference orientation and azimuth information, and the map rotation means rotates the map information based on the rotation angle, and the display means displays the rotated map.

The invention according to claim 5 of the present application refers to a map display system which comprises an information distribution server for distributing map information to a mobile terminal based on position information sent therefrom, wherein the mobile terminal comprises a 2-dimensional code reading means for reading a 2-dimensional code with particular recorded ID information for specifying the 2-dimensional code established at a specific location, as well as communication means and display means for displaying a map, the information distribution server contains position information of a particular location consisting of 2-dimensional code ID information corresponding to a 2-dimensional code, and recording means containing recorded azimuth information of the location in relation to 2-dimensional code read reference orientation, the mobile terminal or information distribution server comprises rotation angle calculation means and/or map rotation means, the 2-dimensional code reading means outputs ID information recorded in the 2-dimensional code, the communication means sends the ID information to the information distribution server and receives map information based on position information coming from the information distribution server, and the rotation angle calculation means calculates the rotation angle according to 2-dimensional code read reference orientation and azimuth information, while the map rotation means rotates the map information based on the rotation angle, and the display means displays the rotated map.

The invention according to claim 6 of the present application refers to a 2-dimensional code recording medium read by a mobile terminal, which comprises 2-dimensional code reading means for reading a 2-dimensional code, display means for displaying a map, and rotation angle calculation means, by which a rotation angle is calculated by specifying map information based on information read from the 2-dimensional code, and the map is rotated by a map rotation means and displayed on the display means, wherein the 2-dimensional code recording medium contains recorded position information of a location consisting of a 2-dimensional code established at such location, and azimuth information of the location in relation to 2-dimensional code read reference orientation.

The invention according to claim 7 of the present application is a 2-dimensional code recording medium used in a map display system configured in a mobile terminal which comprises:

an information distribution server for distributing map information to a mobile terminal based on information sent therefrom, a 2-dimensional code reading means for reading a 2-dimensional code established at a specific location and display means for displaying a map, and wherein either the mobile terminal or information distribution server is provided with rotation angle calculation means and/or map rotation means, and based on information recorded in the 2-dimensional code, the position information of a particular location at which the 2-dimensional code is established and azimuth information of the location in relation to the 2-dimensional code read reference orientation are acquired, and map information is determined based on the position information, and a rotation angle is calculated based on azimuth information of the location in relation to the read reference orientation of the 2-dimensional code, and a map is rotated based on the rotation angle and thereafter displayed on the display means, wherein ID information for identifying the 2-dimensional code is recorded in the 2-dimensional code.

The invention according to claim 8 of the present application pertains to the 2-dimensional code recording medium of claim 7, wherein the position information of a particular location is further recorded in the 2-dimensional code established at such location.

The invention according to claim 9 of the present application pertains to the 2-dimensional code of claim 7 or 8, wherein azimuth information of the location in relation to the 2-dimensional code read reference orientation is recorded in such 2-dimensidnal code.

The invention according to claim 10 of the present application refers to an information distribution server for distributing map information to a mobile terminal, which contains position information of a particular location established at a specific location, and comprises 2-dimensional code reading means for reading a 2-dimensional code recorded with azimuth information of the said location in relation to 2-dimensional code read reference orientation, as well as communication means, display means for displaying a map and rotation angle calculation means, whereby the 2-dimensional code reading means outputs the position information recorded in the 2-dimensional code, the 2-dimensional code read reference orientation and azimuth information, the rotation angle calculation means calculates a rotation angle according to 2-dimensional code read reference orientation and azimuth information, and the display means displays the map rotated based on the rotation angle, and the information distribution server distributes map information to the mobile terminal based on position information received from the mobile terminal.

The invention according to claim 11 of the present application pertains to an information distribution server for distributing map information to a mobile terminal, which contains position information of a particular location established at a specific location, and comprises 2-dimensional code reading means for reading a 2-dimensional code recorded with azimuth information of the said location in relation to the 2-dimensional code read reference orientation, as well as communication means, display means for displaying a map and rotation angle calculation means, whereby the 2-dimensional code reading means outputs the position information recorded in the 2-dimensional code, the 2-dimensional code read reference orientation and azimuth information, the rotation angle calculation means calculates a rotation angle according to 2-dimensional code read reference orientation and azimuth information, and the display means displays the map, wherein the information distribution server rotates map information, which contains position information received from the mobile terminal based on the rotation angle, and distributes such map information to the mobile terminal.

The invention according to claim 12 of the present application pertains to an information distribution server for distributing map information to a mobile terminal, which contains position information of a particular location established at a specific location, and comprises 2-dimensional code reading means for reading a 2-dimensional code recorded with ID information for specifying the 2-dimensional code, as well as communication means, display means for displaying a map and rotation angle calculation means, whereby the 2-dimensional code reading means outputs the position information recorded in the 2-dimensional code and the ID information, the rotation angle calculation means calculates the rotation angle according to 2-dimensional code read reference orientation and azimuth information, and the display means displays the map rotated based on the rotation angle, wherein the information distribution server comprises recording means containing recorded azimuth information of the said location in relation to 2-dimensional code read reference orientation corresponding to 2-dimensional code ID information, and azimuth information of the location in relation to recorded 2-dimensional code read reference orientation corresponding to ID information coming from the mobile terminal is sent thereto, and map information is distributed to the mobile terminal based on position information coming from the mobile terminal.

The invention according to claim 13 of the present application pertains to an information distribution server for distributing map information to a mobile terminal, which contains position information of a particular location which is established at a specific location, and comprises 2-dimensional code reading means for reading a 2-dimensional code with recorded ID information for specifying the 2-dimensional code, as well as communication means and display means for displaying a map, whereby the 2-dimensional code reading means outputs the position information recorded in the 2-dimensional code and the ID information, and the display means displays the map rotated based on a rotation angle, and where the information distribution server comprises rotation angle calculation means and recording means containing recorded azimuth information of the location in relation to the 2-dimensional code read reference orientation corresponding to 2-dimensional code ID information, and the rotation angle is calculated from azimuth information of the location in relation to recorded 2-dimensional code read reference orientation corresponding to ID information coming from the mobile terminal and sent thereto, and map information is distributed to the mobile terminal based on position information sent therefrom.

The invention according to claim 14 of the present application pertains to an information distribution server for distributing map information to a mobile terminal, which contains position information of a particular location established at a specific location, and comprises 2-dimensional code reading means for reading a 2-dimensional code recorded with ID information for specifying the 2-dimensional code, as well as communication means, display means for displaying a map, and rotation angle calculation means, whereby the 2-dimensional code reading means outputs the position information recorded in the 2-dimensional code and the ID information, the rotation angle calculation means calculates the rotation angle according to 2-dimensional code read reference orientation and azimuth information, and the display means displays the map, wherein the information distribution server comprises recording means containing recorded azimuth information of the location in relation to the 2-dimensional code read reference orientation corresponding to 2-dimensional code ID information, and azimuth information of the location in relation to recorded 2-dimensional code read reference orientation corresponding to ID information coming from the mobile terminal is sent thereto, and map information is rotated based on the rotation angle sent from the mobile terminal and distributed thereto based on position information coming from the mobile terminal.

The invention according to claim 15 of the present application pertains to an information distribution server for distributing map information to a mobile terminal, which contains position information of a particular location established at a specific location, and comprises 2-dimensional code reading means for reading a 2-dimensional code recorded with ItD information for specifying the 2-dimensional code, as well as communication means, and display means for displaying a map, whereby the 2-dimensional code reading means outputs the position information recorded in the 2-dimensional code and the ID information, and the display means displays a map, and where the information distribution server comprises rotation angle calculation means and recording means containing recorded azimuth information of the location in relation to 2-dimensional code read reference orientation corresponding to 2-dimensional code ID information, and the rotation angle is calculated according to azimuth information of the location in relation to recorded 2-dimensional code read reference orientation corresponding to ID information sent from the mobile terminal, and map information based on position information coming from the mobile terminal is rotated-based on the rotation angle sent from the mobile terminal and distributed thereto:

The invention according to claim 16 of the present application pertains to an information distribution server for distributing map information to a mobile terminal, which comprises 2-dimensional code reading means for reading a 2-dimensional code established at a specific location and to which ID information is recorded for specifying the 2-dimensional code, as well as communication means, display means for displaying a map, and rotation angle calculation means, whereby the 2-dimensional code reading means outputs the ID information recorded in the 2-dimensional code, the rotation angle calculation means calculates a rotation angle according to 2-dimensional code read reference orientation and azimuth information, the display means displays a map rotated based on the rotation angle, wherein the information distribution server comprises recording means containing recorded position information of a location where the 2-dimensional code corresponding to 2-dimensional code ID information is established and azimuth information of the location in relation to 2-dimensional code read reference orientation, and azimuth information of the location in relation to recorded 2-dimensional code read reference orientation corresponding to ID information coming from the mobile-terminal is sent thereto, and map information based on position information corresponding to ID information coming from the mobile terminal is distributed thereto.

The invention according to claim 17 of the present application pertains to an information distribution server for distributing map information to a mobile terminal, which comprises 2-dimensional code reading means for reading a 2-dimensional code established at a specific location and to which ID information is recorded for specifying the 2-dimensional code, as well as communication means, and display means for displaying a map, whereby the 2-dimensional code reading means outputs the ID information recorded in the 2-dimensional code, and the display means displays a map, and where the information distribution server comprises rotation angle calculation means and recording means containing recorded position information of a particular location established with a 2-dimensional code corresponding to 2-dimensional code ID information and azimuth information of the location in relation to 2-dimensional code read reference orientation, and a rotation angle is calculated according to azimuth information of the location sent to the mobile terminal in relation to recorded 2-dimensional code read reference orientation corresponding to ID information coming from the mobile terminal and map information is distributed to the mobile terminal based on position information corresponding to ID information coming from the mobile terminal.

The invention according to claim 18 of the present application pertains to an information distribution server for distributing map information to a mobile terminal, which comprises 2-dimensional code reading means for reading a 2-dimensional code established at a specific location and to which ID information is recorded for specifying the 2-dimensional code, as well as display means for displaying a map and rotation angle calculation means, wherein the 2-dimensional code reading means outputs the ID information recorded in the 2-dimensional code, the rotation angle calculation means calculates the rotation angle according to 2-dimensional code read reference orientation and azimuth information, and the display means displays a map, wherein the information distribution server comprises recording means containing recorded position information of a particular location where the 2-dimensional code corresponding to 2-dimensional code ID information is established and azimuth information of the location in relation to 2-dimensional code read reference orientation, whereby recorded azimuth information of the location is sent to the mobile terminal in relation to 2-dimensional code read reference orientation corresponding to ID information sent from the mobile terminal, and specified map information based on position information corresponding to ID information sent from the mobile terminal is rotated based on the rotation angle sent from the mobile terminal, and distributed to the mobile terminal.

The invention according to claim 19 of the present application pertains to an information distribution server for distributing map information to a mobile terminal, which comprises 2-dimensional code reading means for reading a 2-dimensional code established at a specific location and to which ID information is recorded for specifying the 2-dimensional code, as well as communication means, and display means for displaying a map, whereby the 2-dimensional code reading means outputs the ID information recorded in the 2-dimensional code, and the display means displays a map, wherein the information distribution server comprises rotation angle calculation means and recording means containing recorded position information of a particular location where the 2-dimensional code corresponding to 2-dimensional code ID information is established and azimuth information of the location in relation to 2-dimensional code read reference orientation, whereby recorded azimuth information of the location is sent to the mobile terminal in relation to recorded 2-dimensional code read reference orientation corresponding to ID information sent from the mobile terminal, and a rotation angle is calculated according to azimuth information of the location in relation to recorded 2-dimensional code read reference orientation corresponding to ID information sent from the mobile terminal, and map information based on position information corresponding to ID information sent from the mobile terminal is rotated based on the rotation angle, and distributed to the mobile terminal.

The invention according to claim 20 of the present application pertains to a computer constituting a mobile terminal equipped with a map display function and contains position information of a particular location where a 2-dimensional code is established, and 2-dimensional code reading means for reading a 2-dimensional code recorded with azimuth information of the location in relation to 2-dimensional code read reference orientation, wherein a program executes the following processes:

reading and outputting the position information recorded in the 2-dimensional code, the 2-dimensional code read reference orientation and azimuth information, calculating a rotation angle according to 2-dimensional code read reference orientation and azimuth information, and rotating and displaying a map based on position information and the calculated angle.

The invention according to claim 21 of the present application pertains to a computer constituting an information distribution server for distributing map information to a mobile terminal, which contains position information of a particular location where a 2-dimensional code is established, and is provided with 2-dimensional code reading means for reading a 2-dimensional code recorded with azimuth information of the location in relation to read reference orientation of the 2-dimensional code, as well as communication means, display means for displaying a map and rotation angle calculation means, wherein the 2-dimensional code reading means outputs the position information recorded in the 2-dimensional code, the 2-dimensional code read reference orientation and the azimuth information, the rotation angle calculation means calculates the rotation angle according to 2-dimensional code read reference orientation and azimuth information, and the display means displays a map rotated based on the rotation angle, wherein a program executes:

a process whereby map information is distributed to the mobile terminal, based on position information received from the mobile terminal.

The invention according to claim 22 of the present application pertains to a computer constituting an information distribution server for distributing map information to a mobile terminal, which contains position information of a particular location where a 2-dimensional code is established, and is provided with 2-dimensional code reading means for reading a 2-dimensional code recorded with azimuth information of the location in relation to 2-dimensional code read reference orientation, as well as communication means, display means for displaying a map and rotation angle calculation means, wherein the 2-dimensional code reading means outputs the position information recorded in the 2-dimensional code, the 2-dimensional code read reference orientation and azimuth information, the rotation angle calculation means calculates a rotation angle according to 2-dimensional code read reference orientation and azimuth information, and the display means displays a map, wherein a program executes the following process:

specifying map information based on position information received from the mobile terminal and the rotation angle, and rotates the map information based on the rotation angle and distributes such map information to the mobile terminal.

The invention according to claim 23 of the present application pertains to a computer constituting an information distribution server for distributing map information to a mobile terminal, which contains position information of a particular location where a 2-dimensional code is established, and is provided with 2-dimensional code reading means for reading a 2-dimensional code recorded with ID information for specifying the 2-dimensional code, as well as communication means, display means for displaying a map and rotation angle calculation means, wherein the 2-dimensional code reading means outputs the position information recorded in the 2-dimensional code and the ID information, the rotation angle calculation means calculates a rotation angle according to 2-dimensional code read reference orientation and azimuth information, and the display means displays a map rotated based on the rotation angle, and where the information distribution server comprises recording means containing recorded azimuth information of the location in relation to 2-dimensional code read reference orientation corresponding to 2-dimensional code ID information, wherein a program executes:

a process whereby azimuth information is sent to the mobile terminal in relation to recorded 2-dimensional code read reference orientation corresponding to ID information sent from the mobile terminal, and a process whereby map information is distributed to the mobile terminal based on position information sent from the mobile terminal.

The invention according to claim 24 of the present application pertains to a computer constituting an information distribution server for distributing map information to a mobile terminal, which contains position information of a particular location where a 2-dimensional code is established, and is provided with 2-dimensional code reading means for reading a 2-dimensional code recorded with ID information for specifying the 2-dimensional code, as well as communication means and display means for displaying a map, whereby the 2-dimensional code reading means outputs the position information recorded in the 2-dimensional code and the ID information, and the display means displays a map rotated based on a rotation angle, wherein the information distribution server comprises rotation angle calculation means and recording means containing recorded azimuth information of the location in relation to 2-dimensional code read reference orientation corresponding to 2-dimensional code ID information, wherein a program executes:

a process whereby a rotation angle is calculated according to azimuth information of the location in relation to recorded 2-dimensional code read reference orientation corresponding to ID information coming from the mobile terminal and sending the rotation angle to the mobile terminal, and a process whereby map information is distributed to the mobile terminal based on position information coming from the mobile terminal.

The invention according to claim 25 of the present application pertains to a computer constituting an information distribution server for distributing map information to a mobile terminal, which contains position information of a particular location where a 2-dimensional code is established, and is provided with 2-dimensional code reading means for reading a 2-dimensional code recorded with ID information for specifying the 2-dimensional code, as well as communication means, display means for displaying a map, and rotation angle calculation means, wherein the 2-dimensional code reading means outputs the position information recorded in the 2-dimensional code and the ID information, the rotation angle calculation means calculates a rotation angle according to 2-dimensional code read reference orientation and azimuth information, and the display means displays a map, and the information distribution server comprises recording means containing recorded azimuth information of the location in relation to 2-dimensional code read reference orientation corresponding to 2-dimensional code ID information, wherein a program executes:

a process whereby azimuth information of the location is sent to the mobile terminal in relation to recorded 2-dimensional code read reference orientation corresponding to ID information coming from the mobile terminal, and map information is rotated based on position information coming from the mobile terminal according to the rotation angle coming from the mobile terminal and distributing such map information to the mobile terminal.

The invention according to claim 26 of the present application pertains to a computer constituting an information distribution server for distributing map information to a mobile terminal, which contains position information of a particular location where a 2-dimensional code is established, and is provided with 2-dimensional code reading means for reading a 2-dimensional code recorded with ID information for specifying the 2-dimensional code, as well as communication means, and display means for displaying a map, wherein the 2-dimensional code reading means outputs the position information recorded in the 2-dimensional code and ID information, and the display means displays a map, the information distribution server comprises rotation angle calculation means and recording means containing recorded azimuth information of the location in relation to the 2-dimensional code read reference orientation corresponding to 2-dimensional code ID information, wherein a program executes:

a process whereby a rotation angle is calculated according to azimuth information of the location in relation to recorded 2-dimensional code read reference orientation corresponding to ID information coming from the mobile terminal, and map information is rotated based on position information coming from the mobile terminal according to the rotation angle coming from the mobile terminal and distributing such map information to the mobile terminal.

The invention according to claim 27 of the present application pertains to a computer constituting an information distribution server for distributing map information to a mobile terminal, which comprises 2-dimensional code reading means for reading a 2-dimensional code established at a specific location and is recorded with ID information for specifying the 2-dimensional code, as well as communication means, display means for displaying a map, and rotation angle calculation means, wherein the 2-dimensional code reading means outputs the ID information recorded in the 2-dimensional code, the rotation angle calculation means calculates a rotation angle according to the 2-dimensional code read reference orientation and azimuth information, the display means displays a map rotated-based on the rotation angle, the information distribution server comprises recording means containing recorded position information of a location where the 2-dimensional code corresponding to 2-dimensional code ID information is established as well as azimuth information of the location in relation to 2-dimensional code read reference orientation, wherein a program executes:

a process whereby, based on ID information coming from the mobile terminal, azimuth information of the location in relation to recorded 2-dimensional code read reference orientation corresponding to such ID information is sent to the mobile terminal, and map information is distributed to the mobile terminal based on position information corresponding to ID information coming from the mobile terminal.

The invention according to claim 28 of the present application pertains to a computer constituting an information distribution server for distributing map information to a mobile terminal, which comprises 2-dimensional code reading means for reading a 2-dimensional code established at a specific location and is recorded with ID information for specifying the 2-dimensional code, as well as communication means, and display means for displaying a map, the 2-dimensional code reading means outputs the ID information recorded in the 2-dimensional code, the display means displays a map rotated based on a rotation angle, and where the information distribution server comprises rotation angle calculation means and recording means containing recorded position information of a particular location set where a 2-dimensional code is established with corresponding 2-dimensional code ID information and azimuth information of the location in relation to 2-dimensional code read reference orientation, wherein a program executes:

a process whereby, based on ID information sent from the mobile terminal, a rotation angle is calculated according to azimuth information of the location in relation to recorded 2-dimensional code read reference orientation corresponding to the ID information and sent to the mobile terminal, and a process whereby map information is distributed to the mobile terminal based on position information corresponding to ID information coming from the mobile terminal.

The invention according to claim 29 of the present application pertains to a computer constituting an information distribution server for distributing map information to a mobile terminal, which comprises 2-dimensional code reading means for reading a 2-dimensional code established at a specific location and recorded with ID information for specifying the 2-dimensional code, as well as communication means, display means for displaying a map, and rotation angle calculation means, wherein the 2-dimensional code reading means outputs the ID information recorded in the 2-dimensional code, the rotation angle calculation means calculates a rotation angle according to 2-dimensional code read reference orientation and azimuth information and the display means displays a map, and where the information distribution server comprises recording means containing recorded position information of a particular location where a 2-dimensional code is established with corresponding 2-dimensional code ID information and azimuth information of the location in relation to 2-dimensional code read reference orientation, wherein a program executes:

a process whereby, based on ID information sent from the mobile terminal, azimuth information of the location is sent to the mobile terminal in relation to recorded 2-dimensional code read reference orientation corresponding to the ID information, and a process whereby specified map information is rotated based on position information corresponding to ID information and the rotation angle coming from the mobile terminal and such map information is distributed to the mobile terminal.

The invention according to claim 30 of the present application pertains to a computer constituting an information distribution server for distributing map information to a mobile terminal, which comprises 2-dimensional code reading means for reading a 2-dimensional code established at a specific location and recorded with ID information for specifying the 2-dimensional code, as well as communication means, and display means for displaying a map, wherein the 2-dimensional code reading means outputs the ID information recorded in the 2-dimensional code, and the display means displays a map, and where the information distribution server comprises rotation angle calculation means and recording means containing recorded position information of a particular location where a 2-dimensional code is established with corresponding 2-dimensional code ID information and azimuth information of the location in relation to 2-dimensional code read reference orientation, wherein a program executes:

a process whereby, based on ID information sent from the mobile terminal, a rotation angle is calculated according to azimuth information of the location in relation to recorded 2-dimensional code read reference orientation corresponding to the ID information, and map information is rotated based on position information corresponding to ID information and the rotation angle coming from the mobile terminal and such map information is distributed to the mobile terminal.

EFFECTS OF THE INVENTION

In the invention according to claim 1, because azimuth information of a 2-dimensional code established for a particular location in relation to read reference orientation recorded in the 2-dimensional code is read, and the angle to which the map should be rotated is calculated from the direction in which the 2-dimensional code was read, the map is thereby rotated and displayed on the mobile terminal, making it easy to view.

In the invention according to claim 2 or 3, because position information recorded in a 2-dimensional code and azimuth information of the 2-dimensional code established for a particular location in relation to read reference orientation of the 2-dimensional code is read, the angle to which the map containing such location should be rotated is calculated from the direction in which the 2-dimensional code was read, and map information is received from an information distribution server, following which the map is rotated, or alternatively, the rotated map information is received from the information distribution server and thereafter displayed on the mobile terminal, thereby making it easy to view.

In the invention according to claim 4 or 5, because azimuth information is recorded in an information distribution server in relation to read reference orientation for respective 2-dimensional codes established at particular locations, with corresponding 2-dimensional code ID information, the mobile terminal can read the position information and the ID information recorded in a 2-dimensional code and receive the azimuth information in relation to read reference orientation for the particular 2-dimensional code from the information distribution server based on the ID information, and the rotation angle calculation means in the mobile terminal or the information distribution server calculates the angle to which the map should be rotated, receives map information from the information distribution server and rotates the map, or alternatively, receives rotated map information from the information distribution server, and displays it on the mobile terminal, thereby making it easy to view. In addition, the production and setting operation of 2-dimensional codes becomes easier, since the azimuth in relation to 2-dimensional code read reference orientation at a particular location can be measured after the 2-dimensional codes have been established for recording in the information distribution server.

In the invention according to claim 6, the mobile terminal comprises a 2-dimensional code reading means for reading a 2-dimensional code, display means for displaying a map, and rotation angle calculation means, and the mobile terminal calculates a rotation angle by specifying map information based on information read from a 2-dimensional code, rotates and displays the map on the display means such that position information pertaining to a location where the 2-dimensional code is set and azimuth information of the location in relation to the 2-dimensional code read reference orientation are recorded in the mobile terminal.

In the invention according to claims 7 to 9, a map can be displayed in such an orientation as to make it easy to view because ID information is recorded in a 2-dimensional code for identifying that 2-dimensional code, and position information of respective 2-dimensional codes established at particular locations corresponding to 2-dimensional code ID information and/or azimuth information in relation to read reference orientation for such locations corresponding to the 2-dimensional code ID information are recorded in an information distribution server, such that the mobile terminal reads the position information and the ID information recorded in a 2-dimensional code, receive azimuth information in relation to read reference orientation for the 2-dimensional code established at such locations from the information distribution server based on the ID information, and the rotation angle calculation means in the mobile terminal or in the information distribution server calculates the angle to which the map should be rotated, receives map information from the information distribution server, and rotates the map, or alternatively, receives the rotated map information from the information distribution server and displays it on the mobile terminal.

Further, since only the ID code is recorded in the 2-dimensional code for identification purposes, the 2-dimensional code recording medium can be reused at other locations if it is in the form of sheets, and applying or peeling them as may be required, and can be particularly useful in situations such as setting 2-dimensional codes at certain venues for onetime events for distributing venue map guidance. In addition, producing and setting up the 2-dimensional codes becomes easier, since the azimuth in relation to a 2-dimensional code read reference orientation at a particular location can be measured after the 2-dimensional codes are established for recording in the information distribution server.

The inventions according to claims 10 to 19 provide for an information distribution server respectively configuring the map display system of claims 2 to 5.

In the invention according to claim 20, a program for executing the processes in accordance with claim 1 can be provided in a computer which configures a mobile terminal. In the inventions according to claims 21 to 30, a program for respectively executing the processes in accordance with claims 10 to 19 can be provided in a computer which configures an information distribution server.

DRAWINGS

FIG. 1 is a pattern diagram illustrating the concept of a 2-dimensional code recorded with position information and azimuth information according to the present invention.

FIG. 4 is a system configuration diagram illustrating the configuration of a map display system according to the present invention.

FIG. 6 is a block diagram illustrating the configuration of the map display-system according to Example 3 of the present invention.

FIG. 9 is a block diagram illustrating the configuration of the map display system according to Example 6 of the present invention.

FIG. 10 is a series of pattern diagrams for explaining usage examples of a map rotation display which uses a 2-dimensional code, wherein FIG. 10(a) illustrates a normal display state, FIG. 10(b) illustrates the scanned state of 2-dimensional code, and FIG. 10(c) illustrates the display state according to the present invention.

BEST MODE FOR CARRYING OUT THE INVENTION

Figure 2:
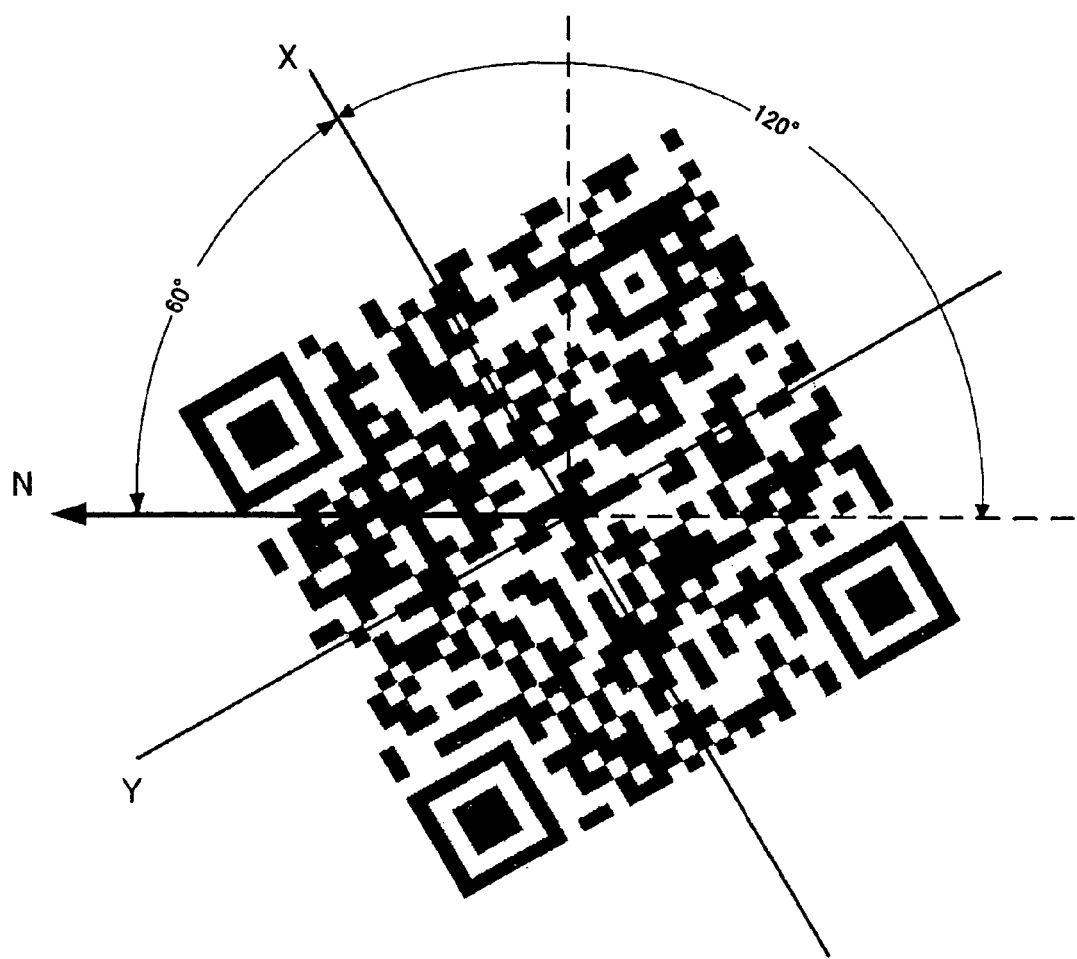
FIG. 2 is a pattern diagram illustrating the principles behind a map rotation display using a 2-dimensional code.
Figure 3:
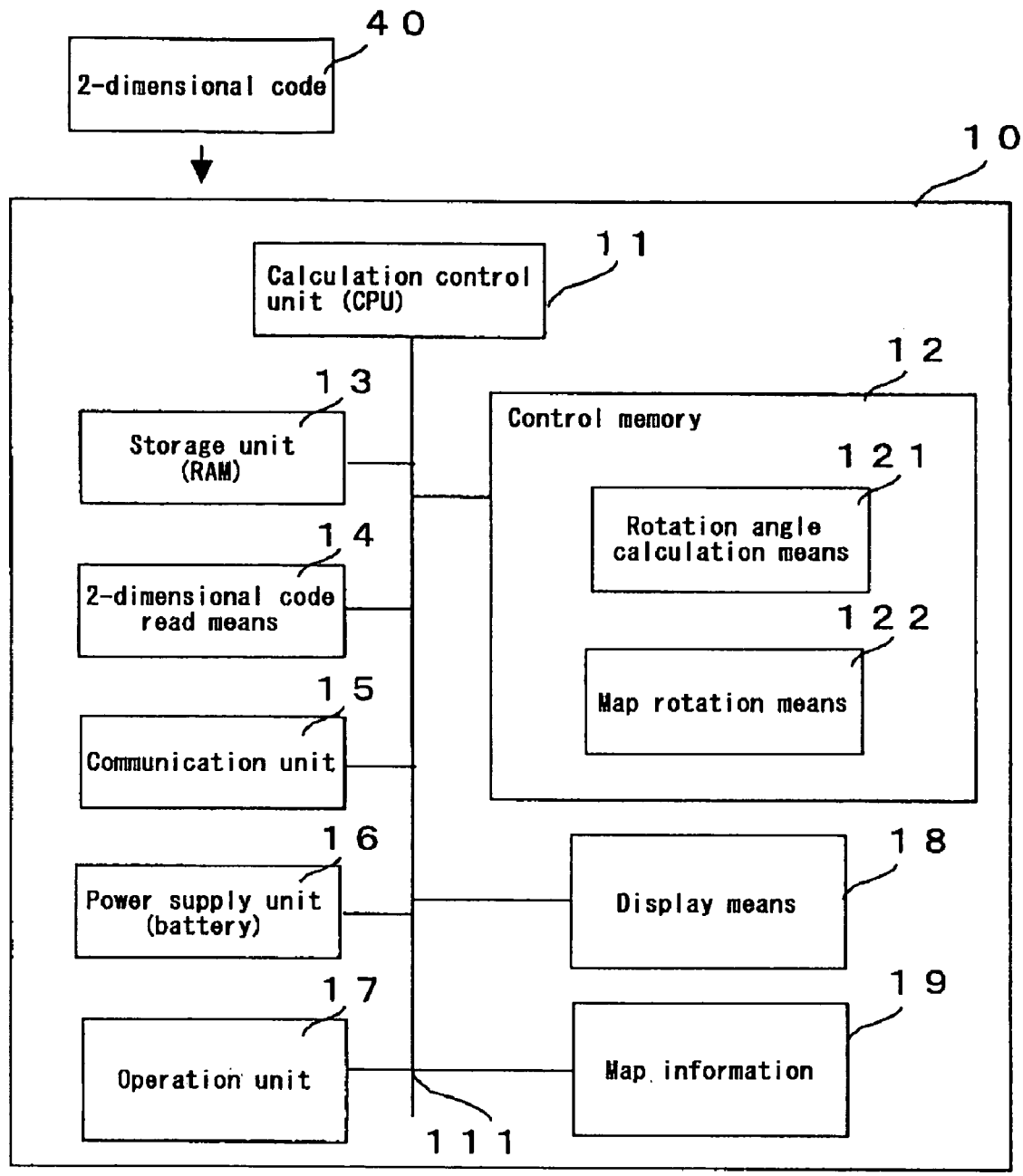
FIG. 3 is a block diagram illustrating the configuration of a mobile terminal equipped with a map display function according to Example 1 of the present invention.
Figure 5:
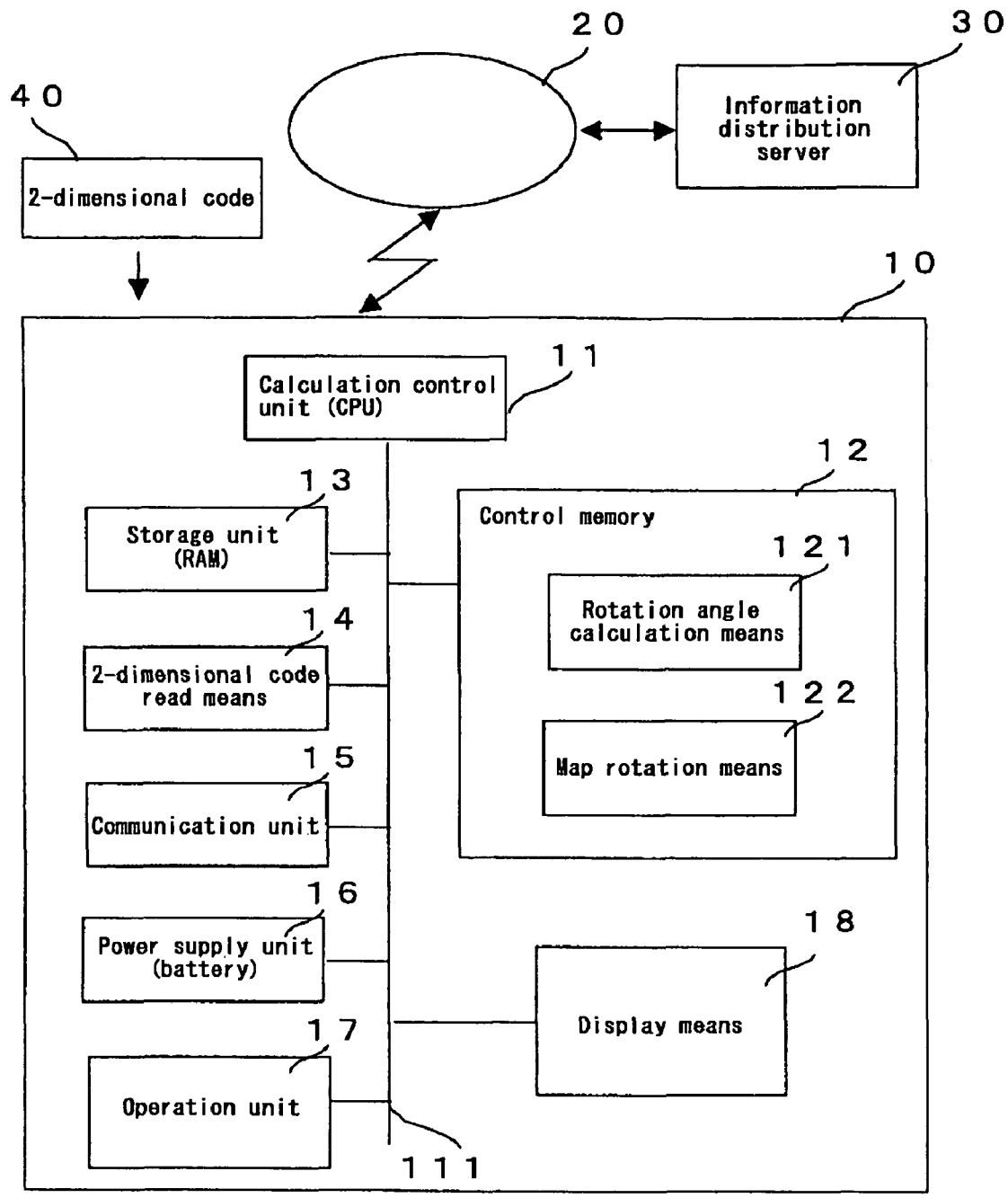
FIG. 5 is a block diagram illustrating the configuration of the map display system according to Example 2 of the present invention.
Figure 7:
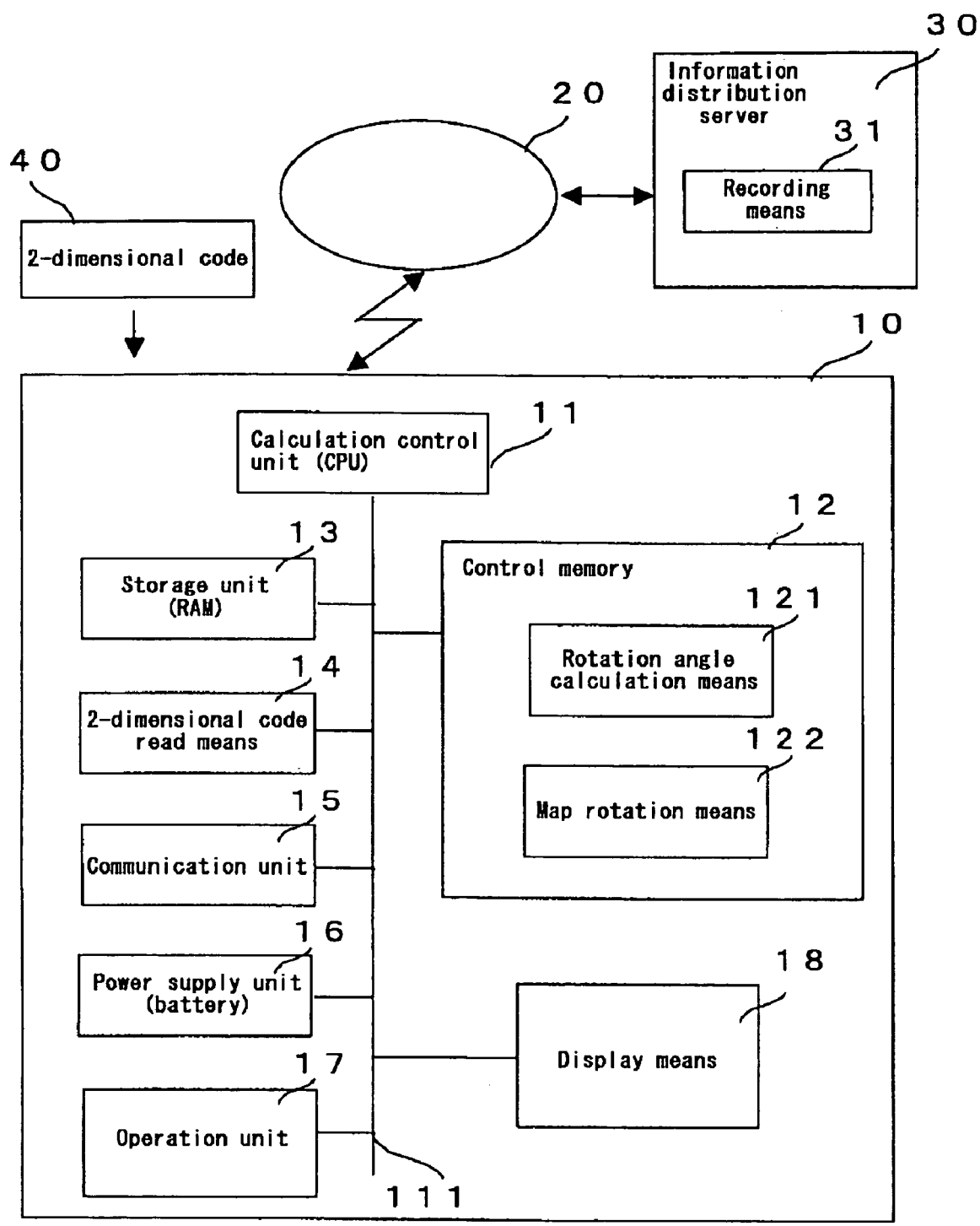
FIG. 7 is a block diagram illustrating the configuration of the map display system according to Example 4 of the present invention.
Figure 8:
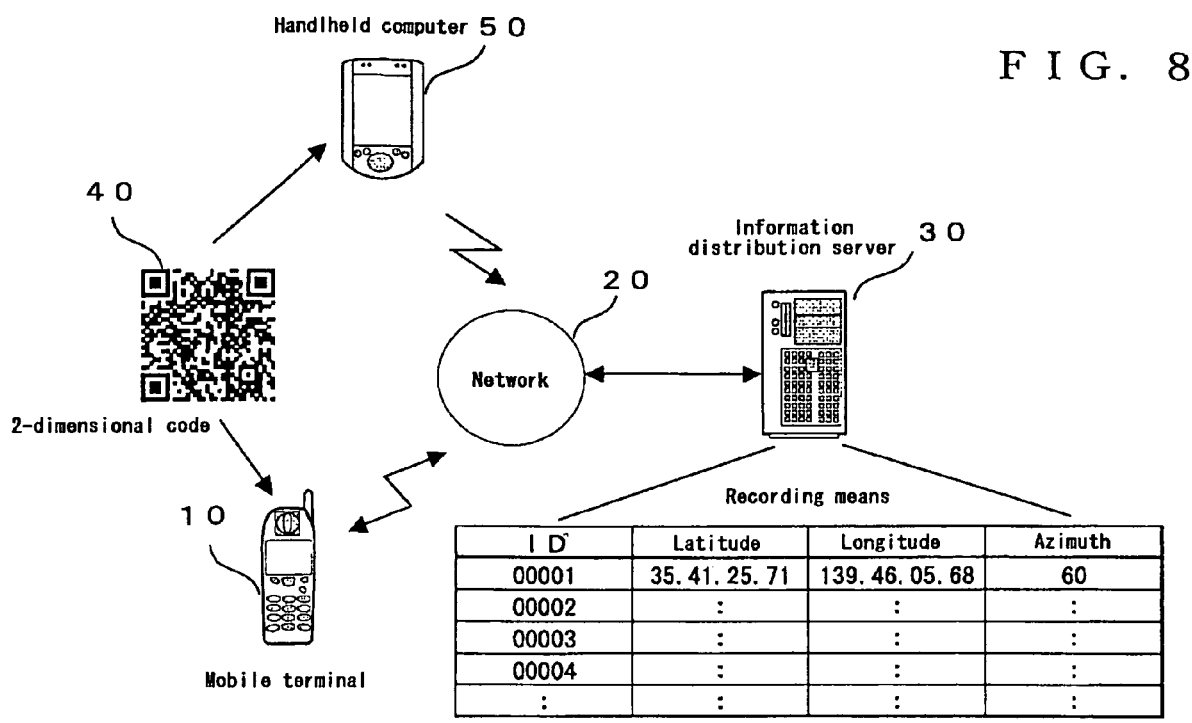
FIG. 8 is a system configuration diagram illustrating another configuration of the map display system according to Example 5 of the present invention.
Figure 10:
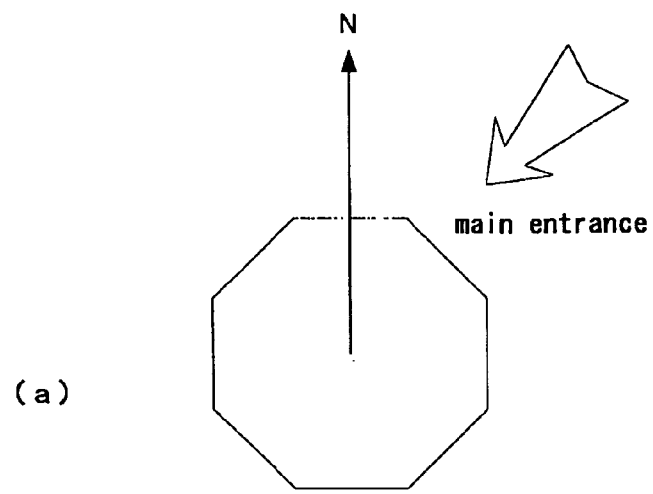
Figure 10:
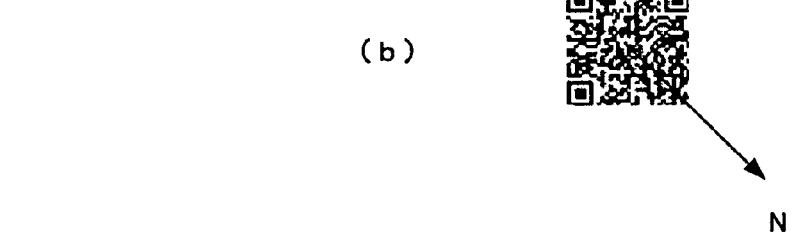
Figure 10:
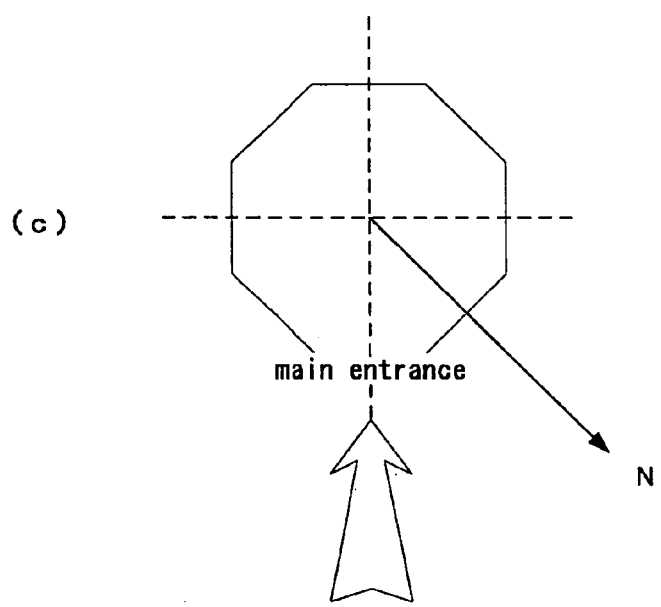

Specific examples of the present invention will now be described in detail using Examples and the drawings. FIG. 1 is a pattern diagram illustrating the concept of a 2-dimensional code recorded with position information and azimuth information according to the present invention, and FIG. 2 is a pattern diagram illustrating the principles behind the operation of a map rotation display using a 2-dimensional code. FIG. 3 is a block diagram illustrating the configuration of a mobile terminal equipped with a map display function according to Example 1 of the present invention, and FIG. 4 is a system configuration diagram illustrating the configuration of a map display system according to the present invention. FIG. 5 is a block diagram illustrating the configuration of the map display system according to Example 2 of the present invention, FIG. 6 is a block diagram illustrating the configuration of the map display system according to Example 3 of the present invention, FIG. 7 is a block diagram illustrating the configuration of the map display system according to Example 4 of the present invention, FIG. 8 is a system configuration diagram illustrating another configuration of the map display system according to Example 6 of the present invention, and FIG. 9 is a block diagram illustrating the configuration of the map display system according to Example 6 of the present invention. FIG. 10 is a series of pattern diagrams for explaining usage examples of a map rotation display which uses a 2-dimensional code, wherein FIG. 10(a) illustrates a conventional display state, FIG. 10(b) illustrates the scanned state of a 2-dimensional code, and FIG. 10(c) illustrates the display state according to the present invention.

Since code read reference orientation can be detected when a 2-dimensional code is being scanned, the present invention focuses on the fact that if position information regarding the place where a mobile terminal reads a 2-dimensional code (i.e., position information of a particular location) and azimuth information in relation to the 2-dimensional code read reference orientation can be acquired, a map can be specified based on the position information, and a rotation angle for rotating a map to display it on a display section of the mobile terminal can be calculated from the read reference orientation and corresponding azimuth information with respect thereto.

In the present invention, 2-dimensional codes established at specific locations are employed. A 2-dimensional code for example, pertains to a tile-shaped object that can be set on a sidewalk, for which a 2-dimensional code is recorded. As illustrated in FIG. 1, using the QR code described in Patent Document 4 as a 2-dimensional code, if the particular location where a tile recorded with such a 2-dimensional code is at lat. 35° 41' 25.71" N and long. 139° 46' 05.68" E, and the north bearing in relation to 2-dimensional code read reference orientation is 60° at an anticlockwise angle, the X axis being 0°, the character string 35.41.25.71, 139.46.0568, N=60 is produced using a QR code and recorded in the 2-dimensional code.

In addition, in a system for distributing map information originating from an information distribution server, the URL for the information distribution server can be included in the 2-dimensional code. If latitude and longitude representing position information are recorded in units divided into hundredths of a second, a position for which a 2-dimensional code is established can be specified to a resolution of approximately 30 cm. Even if combined with the URL of an information distribution server, a character string can be easily recorded with one QR code.

When this 2-dimensional code is read by a mobile terminal in the orientation as illustrated in FIG. 2, it can be seen from the positional relationship of the read reference orientation (X-axis, Y-axis) that the 2-dimensional code was read from a direction rotated 120° anticlockwise, as compared with FIG. 1. Accordingly, the image of the scanned 2-dimensional code can be rotated in relation to read reference orientation, and the resulting image can then be read. Patent Document 5 describes a method for rotating an image in relation to read reference orientation. In addition, in the same manner that a camera is mounted onto a mobile phone or similar device, a camera for reading a 2-dimensional code mounted onto a mobile terminal can be employed as reading means. While the 2-dimensional code is being read, position information can be acquired, and if the mobile terminal contains recorded map information, such map information can be specified. If the mobile terminal comprises a system which acquires map information from an information distribution server, the mobile terminal can send position information to the information distribution server and then receive the applicable map information.

Based on the information scanned from a 2-dimensional code, it can be understood that the north bearing in relation to 2-dimensional code read reference orientation is 60° at an anticlockwise angle, the X axis being 0°. It can further be understood that north lies at an orientation of 180°, in view of the fact that the direction from which the 2-dimensional code was scanned, was rotated by 120°. Therefore, if the map displayed on the mobile terminal is a typical north-up map wherein north lies at an orientation of 90°, it becomes necessary to rotate the map only for another 90°.

Thus, by recording the north bearing in a 2-dimensional code as azimuth information in relation to the read reference orientation for a position where the 2-dimensional code is established, it is possible for a mobile terminal which has read the 2-dimensional code at the location to calculate the number of degrees by which the rotation angle must be rotated, and based on this angle the map can be rotated and displayed so that the map can be easily understood. By being rotated in this manner, the map displayed will be actually linked with the azimuth of the location in question, and can therefore be combined with a navigation system so that a route guide received during navigation can be easily understood.

EXAMPLE 1

The present invention is based upon the principles described above. As illustrated in FIG. 3, a mobile terminal 10 having the map display function according to Example 1 is configured based on a calculation control unit (CPU) 11 which comprises a microcomputer, and like a typical mobile-type information terminal, also comprises a control memory 12, a storage unit (RAM) 13, 2-dimensional code reading means 14, a communication unit 15, a power supply unit 16, an operation unit 17, display means 18 and map information 19, wherein each of these elements is connected to an internal bus 111 and is under the control of the calculation control unit 11 based on a program recorded in the control memory 12.

The 2-dimensional code reading means 14 may, for example, consist of a camera mounted onto a mobile phone. The 2-dimensional code 40 shown in FIGS. 1 and 2 is read as an image, and the read reference orientation is detected from the scanned data, whereby the coded recorded information is regenerated. If the 2-dimensional code is in QR format, the code can be read using the method described in Patent Document 4. The information recorded in the 2-dimensional code comprises position information of the specific location where the 2-dimensional code has been established and azimuth information of that location in relation to 2-dimensional code read reference orientation. As illustrated in FIG. 2, if a mobile terminal 10 reads the 2-dimensional code 40, it can be seen that the position where the 2-dimensional code is established is lat. 35° 41' 25.71" N and long. 139° 46' 05.68" E, and the north bearing in relation to the 2-dimensional code read reference orientation is 60° at an anticlockwise angle, the X axis being 0°, as may be read from the positional relationship of the read reference orientation (X-axis, Y-axis), particularly that the 2-dimensional code was read from a direction rotated 120° anticlockwise.

The 2-dimensional code reading means 14 outputs the position information read from the 2-dimensional code (lat. 35° 41' 25.71" N and long. 139° 46' 05.68" E), the azimuth information of that location in relation to the read reference orientation (60°), and the angle deviation at which the 2-dimensional code was read (120°). As a result, a map containing the position lat. 35° 41' 25.71" N and long. 139° 46' 05.68" E is specified from the map information 19 and read out. Meanwhile, the rotation angle calculation means 121 of the control memory 12 calculates the angle at which the map to be displayed on the display section -is to be rotated viewed from the 120° angle deviation at which the 2-dimensional code was read.

In other words, as illustrated in FIGS. 1 and 2, based on information read from a 2-dimensional code, it is understood that the north bearing in relation to the 2-diimensional code read reference orientation is 600 at an anticlockwise angle, the X axis being 0°. Based on the fact that the scanned direction of the 2-dimensional code is rotated 120°, it is also understood that north lies at an orientation of 180°. Therefore, if the map displayed on the mobile terminal is a typical north-up map wherein north lies at an orientation of 90°, it is only necessary to rotate the map another 90°, so that a rotation angle of 90° is calculated. Hereafter, the map rotation means 122 rotates the map read from the map information 19 based on the 90° rotation angle that the rotation angle calculation means 121 calculated, and the rotated map is displayed on the display means 18.

While Example 1 illustrated in FIG. 3 pertains to a configuration wherein the mobile terminal contains map information, a map display system configured in the manner that map information is downloaded from an information distribution server is also acceptable. FIG. 4 is a diagram illustrating the network configuration of such a map display system, and is configured in such a way that the mobile terminal 10 is a device which subscribes to a communications service operator, such as an Internet provider or a mobile phone company, the mobile terminal 10 being connected to an information distribution server 30 through a network 20 (Internet). The information distribution server 30 can be any device provided it contains map information. For example, the information distribution server 30 can be an information distribution server established by an Internet provider to provide services, or an information distribution server for providing navigation services, or an information distribution server established by a business or a retail shop etc., or a device which obtains map information from a desired server such as the abovementioned.

In this map display system, a 2-dimensional code 40, which is established at a specific location such as a sidewalk, a wall, a power pole or the like, is read, and the position information is sent to an information distribution server 30, which distributes map information to the mobile terminal 10 based on the position information. As is the case in Example 1, the mobile terminal 10 displays a rotated map. As will be shown in the following Examples, in such a map display system, rotation of the map may be carried out by the mobile terminal 10 or the information distribution server 30.

EXAMPLE 2

FIG. 5 is a block diagram illustrating the configuration of the map display system according to Example 2 of the present invention. Like the network configuration illustrated in FIG. 4, this map display system is configured in an information distribution server 30 and a mobile terminal 10 which can connect to the latter through a network 20 (Internet). The information distribution server 30 contains map information. A 2-dimensional code 40 established at a specific location, such as a power pole, a sidewalk or the like, is read by the mobile terminal 10, which then receives map information encompassing such location from the information distribution server 30, and displays such information on the display means 18. Similarly as in Example 1, position information (latitude and longitude) of the location where a 2-dimensional code has been established and azimuth information of that location in relation to the 2-dimensional code read reference orientation are recorded in the 2-dimensional code 40.

The configuration of the mobile terminal 10 is similar to that of Example 1 (FIG. 3), except that it does not hold map information. The mobile terminal 10 thus comprises a calculation control unit (CPU) 11, a control memory 12, a storage unit (RAM) 13, a 2-dimensional code reading means 14, a communication unit 15, a power supply unit 16, an operation unit 17 and display means 18. Further, the control memory 12 comprises rotation angle calculation means 121 and map rotation means 122. When the 2-dimensional code 40 is read by the 2-dimensional code reading means 14, position information is sent from the communication unit 15 to the information distribution server 30, and the applicable map information is distributed from the information distribution server 30.

The rotation angle calculation means 121 calculates the angle at which the map distributed from the information distribution server 30 should be rotated based on azimuth information of the location in relation to the 2-dimensional code read reference orientation which was read from a 2-dimensional code and the read reference orientation of the 2-dimensional code information, while the map rotation means 122 rotates the map based on the rotation angle calculated by the rotation angle calculation means 121, and the rotated map is displayed on the display means 18.

EXAMPLE 3

In Example 2 (FIG. 5), while a mobile terminal 10 sends position information read from a 2-dimensional code to an information distribution server 30, and receives map information based on such position information coming from the information distribution server 30, whereby the distributed map is displayed on a display means by rotating the map at a rotation angle calculated by the mobile terminal 10, the mobile terminal 10 can also be configured in such manner that it sends position information and a rotation angle to the information distribution server 30, and the map is then rotated by the information distribution server 30 for distribution back to the mobile terminal 10, so that the mobile terminal 10 can display the distributed map on a display means. FIG. 6 is a diagram illustrating the configuration of the map display system according to Example 3 of the present invention which is configured in this manner.

As illustrated in FIG. 6, the map display system according to Example 3 comprises a mobile terminal 10 having a 2-dimensional code reading means 14 for reading a 2-dimensional code 40, and an information distribution server 30 for communicating with the mobile terminal 10 through a network 20. The configuration of the mobile terminal 10 is basically the same as that of the mobile terminal 10 of Example 2 (refer to FIG. 5), except that here, the mobile terminal 10 does not have map rotation means and the information distribution server 30 itself conducts the map rotation.

The mobile terminal 10 reads a 2-dimensional code 40 and sends the position information recorded in the 2-dimensional code 40 to the information distribution server 30. Furthermore, similar to Examples 1 and 2, the map rotation angle is calculated by the rotation angle calculation means 121, and this rotation angle is sent to the information distribution server 30. The information distribution server 30 then specifies the applicable map information based on the position information received from the mobile terminal 10, rotates the map based on the rotation angle, and distributes the rotated map information to the mobile terminal 10. The mobile terminal 10 thus displays the map on a display. means based on such map information received.

EXAMPLE 4

In Examples 2 and 3, while the position information of a particular location pertaining to a 2-dimensional code 40 and azimuth information of that location in relation to the 2-dimensional code read reference orientation are recorded in the 2-dimensional code 40, the configuration of the mobile terminal may be such that the 2-dimensional code is recorded with ID information for identifying the 2-dimensional code and position information, each 2-dimensional code being matched with an ID code in an information distribution server, and each 2-dimensional code being recorded with azimuth information of the location in relation to the 2-dimensional code read reference orientation at the particular location, whereby the mobile terminal 10 reads a 2-dimensional code, sends the position information and the ID information to the information distribution server 30, and receives the azimuth information of the location in relation to the 2-dimensional code read reference orientation from the information distribution server 30.

As illustrated in FIG. 7, the map display system according to Example 4 is configured in a mobile terminal 10 comprising 2-dimensional code reading means 14 for reading a 2-dimensional code 40, and an information distribution server 30 for communicating with the mobile terminal 10 through a network 20. The 2-dimensional code 40 is recorded with position information of a particular location and ID information for identifying the 2-dimensional code. The configuration of the mobile terminal 10 is basically the same as that of the mobile terminal 10 of Example 2 (refer to FIG. 5), but differs from that of Examples 2 and 3 in that the information distribution server 30 comprises recording means 31 in which each 2-dimensional code is matched with ID information and the azimuth information of a location is recorded in relation to the 2-dimensional code read reference orientation at the location where each 2-dimensional code is established.

The mobile terminal 10 reads the 2-dimensional code 40 and sends the position information and the ID information recorded in the 2-dimensional code 40 to the information distribution server 30. The information distribution server 30 reads out the azimuth information of the location in relation to the read reference orientation of the applicable 2-dimensional code based on the ID information from the recording means 31 and sends the read out azimuth information to the mobile terminal 10. The mobile terminal 10 uses this azimuth information to calculate the rotation angle for rotating the map with the rotation angle calculation means 121. The map information distributed from the information distribution server 30 is then rotated by the map rotation means 122, and displayed on the display means 18.

Similar to Example 3 (refer to FIG. 6), the mobile terminal 10 of Example 4 does not have map rotation means, so that the mobile terminal may be configured in such manner that the rotation angle calculation means 121 sends the calculated rotation angle to the information distribution server 30, and the map is rotated at the information distribution server 30 and sent to the mobile terminal 10 (refer to FIG. 6 and Example 3). The setting operation of the 2-dimensional code is made easier in the case of the configuration of Example 4.

In order words, in Examples 1 to 3, since the azimuth information of a particular location is recorded in a 2-dimensional code, if the 2-dimensional code is set up facing the wrong direction, modification becomes difficult. For example, if a 2-dimensional code is recorded with reference to a sidewalk tile, the only way to modify or correct this is by replacing the subject tile. In addition, consideration must be made in advance of the tenuousness of the azimuth of a particular location, making such tile production a difficult operation. In contrast, according to the configuration of Example 4, a tile can be laid out correctly by using position information (latitude and longitude) of the location in question. Since each 2-dimensional code is recorded with position information and ID information for identifying the applicable 2-dimensional code, measuring the orientation and actual azimuth of each 2-dimensional code once the laying out is completed, matching such information with the ID information and recording it in the recording means of an information distribution server is made possible. In this manner, the abovementioned difficulties can be minimized. Furthermore, the position information can be directly read from a 2-dimensional code, thereby enabling shared use of services other than map display.

In the above Example 4, the mobile terminal 10 comprises rotation angle calculation means 121, and is configured in such manner that ID information read from a 2-dimensional code 40 is sent to an information distribution server, whereby azimuth information corresponding to the applicable 2-dimensional code is acquired and a rotation angle for rotating the map-is calculated by the rotation angle calculation means 121. However, in another possible configuration, the rotation angle calculation means is provided in the information distribution server 30, so that the rotation angle for rotating the map is calculated by the information distribution server and is distributed along with map information to the mobile terminal 10, or alternatively, map information which has been rotated based on the calculated rotation angle can be distributed to the mobile terminal 10.

Further, while a 2-dimensional code 40 is recorded with position information of a location where the 2-dimensional code 40 is set up and ID information for identifying the 2-dimensional code 40 in the map display system according to Example 4, another possible configuration is to record only ID information for identifying the 2-dimensional code in the 2-dimensional code 40, whereby each 2-dimensional code is matched with an ID code in an information distribution server, and each 2-dimensional code is recorded with azimuth information of the location in relation to the 2-dimensional code read reference orientation for the locations where each 2-dimensional code has been established, and position information of the set location is also recorded, wherein the mobile terminal 10 reads the 2-dimensional code, sends the ID information to the information distribution server 30, and receives the azimuth information of the location in relation to the 2-dimensional code read reference orientation from the information distribution server 30.

EXAMPLE 5

FIG. 8 is a diagram illustrating the configuration of such a map display system, and is configured in such manner that the mobile terminal 10 is a device which is subscribed to a communications service operator, such as an Internet provider or a mobile phone company, wherein the mobile terminal 10 may be connected to an information distribution server 30 through a network 20 (Internet). The information distribution server 30 can be any device as long as it contains map information. For example, the information distribution server 30 can be an information distribution server established by an Internet provider to provide services, or an information distribution server for providing navigation services, or an information distribution server established by a business or a retail shop etc., or a device which obtains map information from a desired server such as the abovementioned. A handheld computer 50 comprises 2-dimensional code reading means, GPS positioning means, an electronic compass and communication means, and has been authenticated with the information distribution server 30 as an information recording terminal.

In the map information display system of Example 5, the 2-dimensional code 40 is recorded only with ID information used for identification and URL information used for data recording into the information distribution server 30, and is set up at a specific location, such as a sidewalk, wall, power pole or the like. ID information of each 2-dimensional code 40 is read by the handheld computer 50, which uses GPS positioning means to request position information (latitude and longitude) of a particular location. The electronic compass serves to calculate the azimuth of such location in relation to the 2-dimensional code read reference orientation. This information is sent to the information distribution server 30 using a URL read from the 2-dimensional code 40, and matched with ID information of each 2-dimensional code for recording in the recording means.

The configuration of this map display system is similar to the configuration illustrated in FIG. 7, wherein the mobile terminal 10 reads a 2-dimensional code 40 which is established at a specific location such as a sidewalk, wall, power pole or the like, and sends the ID information to an information distribution server 30. Based on the ID information contained in the recording means 31, the information distribution server 30 reads out position information corresponding to the 2-dimensional code and azimuth information of the location in question in relation to the 2-dimensional code read reference orientation. The information distribution server 30 sends the read out azimuth information of the location in relation to the 2-dimensional code read reference orientation to the mobile terminal 10, and also specifies the applicable map information based on the position information for distribution to the mobile terminal 10.

The mobile terminal 10 calculates a rotation angle of the map with the rotation angle calculation means 121 according to azimuth information of the location in relation to the 2-dimensional code read reference orientation sent from the information distribution server 30. Based on the rotation angle calculated by the rotation angle calculation means 121, the map rotation means 122 in the mobile terminal 10 rotates the map information distributed from the information distribution server 30, and the display means 18 displays the rotated map. While rotation of the map in FIG. 7 is performed by the mobile terminal 10, rotation of the map may also be carried out by the information distribution server 30.

EXAMPLE 6

FIG. 9 is a diagram illustrating the configuration of the map display system according to Example 6 of the present invention, which is configured in such manner that rotation of the map is carried out by the information distribution server 30. The map display system illustrated in FIG. 9 comprises a mobile terminal 10 having 2-dimensional code reading means 14 for reading a 2-dimensional code 40, and an information distribution server 30 for communicating with the mobile terminal 10 through a network 20. The configuration of the mobile terminal 10 is basically similar to that of the mobile terminal 10 of Example 2 (refer to FIG. 5), but differs from that of FIG. 7 in that the present mobile terminal 10 is not provided with map rotation means and the information distribution server 30 carries out the map rotation.

The mobile terminal 10 reads a 2-dimensional code 40 which is established at a specific location, such as a sidewalk, wall, power pole or the like, and sends the ID information to the information distribution server 30. Based on ID information coming from the recording means 31, the information distribution server 30 reads out position information corresponding to the 2-dimensional code and azimuth information of such location in relation to the 2-dimensional code read reference orientation. The information distribution server 30 sends the read out azimuth information of the location in relation to the 2-dimensional code read reference orientation to the mobile terminal 10, and also specifies the applicable map information based on the position information. Meanwhile, the mobile terminal 10, based on the azimuth information of the location in relation to the 2-dimensional code read reference orientation sent from the information distribution server 30, calculates the rotation angle to which the rotation angle calculation means 121 should rotate the map, and sends the calculated rotation angle to the information distribution server 30.

The information distribution server 30 uses the map rotation means 122 to rotate the specified map information based on the position information and according to the rotation angle sent from the mobile terminal 10, and distributes the rotated map information to the mobile terminal 10. The mobile terminal 10 displays the map information sent from the information distribution server 30 on a display means 18.

In the above-described Examples 5 and 6, the mobile terminal 10 comprises rotation angle calculation means 121, and is configured in such manner that ID information read from a 2-dimensional code 40 is sent to an information distribution server, whereby the azimuth information corresponding to the applicable 2-dimensional code is acquired for the rotation angle calculation means 121 to calculate the rotation angle for rotating the map. However, in another possible configuration, the rotation angle calculation means is provided for in the information distribution server 30, so that the rotation angle for rotating the map is calculated by the information distribution server and is distributed along with map information to the mobile terminal 10, or alternatively, map information which has been rotated based on the calculated rotation angle can be distributed to the mobile terminal 10.

Although it was explained in Examples 5 and 6 that the handheld computer 50 measures information relating to a particular location for each 2-dimensional code 40 in the information distribution server 30 via a network for storing online, in cases where the handheld computer 50 does not have an online communications function, there is no need to record the URL of the information distribution server 30 in the 2-dimensional code 40. Thus, the configuration can be such that once the handheld computer 50 has finished collecting information, it is connected with a cable to the information distribution server 30 for storing the information of each 2-dimensional code 40 set location.

The configuration, as illustrated in Examples 5 and 6, wherein only ID information is recorded into the 2-dimensional code 40, and position information of a particular location constituting a 2-dimensional code and azimuth information of the location in relation to the 2-dimensional code read reference orientation are matched with the ID information and recorded in the information distribution server, has the following advantages. According to such a configuration, the 2-dimensional code recording medium can be reused at other locations if it is in the form of sheets, and applying or peeling them as may be required, and can be particularly useful in situations such as setting 2-dimensional codes at certain venues for onetime events for distributing venue map guidance.

According to the mobile terminal or map display system of the present invention, it is possible not only to display a map in accordance with its actual azimuth, but also in an easily understandable orientation. The front side of an art gallery, a concert hall, a public building or such other structure need not be oriented to the north, south, east, or west. Conventionally, when displaying a place map or a guide map obtained from a link to a URL which is recorded in a 2-dimensional code printed on a medium such as a book, a magazine or the like, the targeted building was displayed only in a north-up orientation. According to the present invention, the entrance to a building can also be displayed in a downward-facing orientation by utilizing the azimuth information of the location in relation to the read reference orientation of the corresponding 2-dimensional code.

FIG. 10 is a series of pattern diagrams for explaining usage examples of a map rotation display using a 2-dimensional code, and which illustrates a concert hall and the display thereof, whereby the main entrance of the building is located in the northeast. An introductory article about this concert hall and a 2-dimensional code appear in a printed guidebook. To obtain a map, an ordinary mobile-phone or the like equipped with a camera is used to read the 2-dimensional code of the guidebook and its link to the URL which is recorded in this 2-dimensional code. FIG. 10(*a*) shows the display of the map oriented in the normal north-up manner. FIG. 10(*b*) shows that if azimuth N=315 information has been recorded in the 2-dimensional code and the 2-dimensional code is read by a mobile terminal, as illustrated in FIG. 3, and the azimuth is used to calculate the rotation angle of the guidebook, the rotation angle of the guidebook 2-dimensional code would be 0, and the north orientation recognized as 315°, so that a rotation angle of 225° is calculated and map rotation carried out. The map to be displayed by the display means would be as shown in FIG. 10(*c*), wherein the main entrance is facing downward. This confers a sense of reality, giving the viewer the illusion of being in front of the main entrance. If combined with images such as published photographs or the like, guidance which is very easy to understand can be provided.

In each of the above Examples the mobile terminal referred to is assumed to be a typical mobile phone equipped with a camera on the side opposite to the main LCD display. In the case however of a mobile phone whose display rotates around the optical axis of the camera (e.g., a "revolving type"), or where the optical axis of the mobile terminal's camera substantially differs in orientation from that of the main LCD display, it goes without saying that the display orientation of various designs complies with the intent of the present invention such that the rotation angle can be calculated.

Further, in the system for recording azimuth information in a 2-dimensional code, arrangements may be made, such that the upwards orientation as viewed from the read reference direction, for example, will always be "north", as implicit azimuth information. Such case would be similar to the case where the information N=90 is included even if the character string for azimuth information is not contained therein. Thus, setting a 2-dimensional code having implicit azimuth information carries with it the advantage of reducing the amount of 2-dimensional code information, although an upwards direction as viewed from a read reference direction such as "north" must be pre-determined.

INDUSTRIAL APPLICABILITY

As described above, the present invention can obviously be used for providing position information where GPS cannot be used, such as underground shopping areas, building interiors etc., and since the display direction can be determined by associating with the direction of a 2-dimensional code, it is possible to provide an easy to understand guide. Further, by establishing several 2-dimensional codes, it is also possible to provide a walking route guide while updating position information by tracking along the established 2-dimensional codes. For example, by setting up a 2-dimensional code at a corridor intersection of a hospital, the present invention can also be utilized as a system for navigating routes to other places within the hospital, such as the reception area, outpatient clinic, accounting section, visitors' lobby and the like.

What is claimed is:

1. A mobile terminal equipped with a map display function, comprising:
    a 2-dimensional code reading device to read a 2-dimensional code established at a particular location, the 2-dimensional code including position information of the particular location and corresponding recorded azimuth information for indicating the azimuth at the location, in relation to a 2-dimensional code read reference orientation, as an angle between north bearing and the 2-dimensional code read reference orientation, and to determine an angle deviation from which the 2-dimensional code was read by the 2-dimensional code reading device, and the 2-dimensional code reading device outputs the position information, the 2-dimensional code read reference orientation, the azimuth information, and the angle deviation from which the 2-dimensional code was read;
    a rotation angle calculation device to calculate a rotation angle at which a map is to be displayed so that the map is viewed properly from the angle deviation from which the 2-dimensional code was read according to the 2-dimensional code read reference orientation and the angle to the 2-dimensional code read reference orientation, which angle is azimuth information to calculate the rotation;
    map rotation device to rotate the map obtained based on the position information according to the rotation angle; and
    a display device to display the rotated map.

* * * * *